US012738643B2

(12) United States Patent
McBryde et al.

(10) Patent No.: US 12,738,643 B2
(45) Date of Patent: Sep. 15, 2026

(54) LOW SIDE LOBE LEVEL AESA HYBRID FATE / ENSEMBLE CALIBRATION

(71) Applicant: Rockwell Collins, Inc., Cedar Rapids, IA (US)

(72) Inventors: Connor C. McBryde, Cedar Rapids, IA (US); James B. West, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 388 days.

(21) Appl. No.: 18/216,429

(22) Filed: Jun. 29, 2023

(65) Prior Publication Data

US 2025/0007155 A1 Jan. 2, 2025

(51) Int. Cl.

| | |
|---|---|
| ***H01Q 3/00*** | (2006.01) |
| ***H01Q 3/26*** | (2006.01) |
| ***H01Q 3/28*** | (2006.01) |
| ***H01Q 3/36*** | (2006.01) |
| *G01S 7/40* | (2006.01) |

(52) U.S. Cl.

CPC ............... *H01Q 3/267* (2013.01); *H01Q 3/28* (2013.01); *H01Q 3/36* (2013.01); *G01S 7/4004* (2013.01); *G01S 7/4086* (2021.05); *H01Q 3/26* (2013.01)

(58) Field of Classification Search

CPC ............ H01Q 3/267; H01Q 3/28; H01Q 3/36; H01Q 3/26; G01S 7/4086; G01S 7/4004; H04B 17/12

USPC .......................................................... 342/372

See application file for complete search history.

(56) References Cited

U.S. PATENT DOCUMENTS

| | | | | |
|---|---|---|---|---|
| 5,412,414 | A | 5/1995 | Ast et al. | |
| 7,119,739 | B1 * | 10/2006 | Struckman | G01R 29/10 342/372 |
| 9,360,549 | B1 * | 6/2016 | Liu | G01S 7/4026 |
| 9,409,151 | B1 * | 8/2016 | West | G01S 7/4017 |
| 9,705,611 | B1 * | 7/2017 | West | H04B 5/73 |

(Continued)

FOREIGN PATENT DOCUMENTS

| | | | | |
|---|---|---|---|---|
| CN | 119094046 A | * 12/2024 | H04B 17/221 |
| EP | 1178562 A1 | 2/2002 | |

(Continued)

OTHER PUBLICATIONS

S.D. Silverstein, et al. “Application of orthogonal codes to the calibration of active phased array antennas for communication satellites”; IEEE Transactions on Signal Processing, vol. 45, Issue : 1, Jan. 1997.

(Continued)

*Primary Examiner* — Chuong P Nguyen

(74) *Attorney, Agent, or Firm* — Suiter Swantz IP

(57) ABSTRACT

A calibration system for AESAs induces the AESA to produce a far field radiation pattern while near field measurements are taken; an initial calibration is produced, and complex aperture holograms are calculated. Based on the complex holograms, phase and amplitude error maps are computed. T/R module amplitude and phase are then adjusted to compensate for the error map. The system evaluates the refined far field radiation pattern to iteratively recompute complex aperture excitations to realize adequate far field performance and new hologram error maps until a desired level of precision is reached.

17 Claims, 3 Drawing Sheets

(56) References Cited

U.S. PATENT DOCUMENTS

| | | | | |
|---|---|---|---|---|
| 9,825,360 | B2 * | 11/2017 | Miller | H04K 3/00 |
| 10,256,922 | B2 * | 4/2019 | Rowell | H04B 17/12 |
| 10,965,386 | B1 * | 3/2021 | Davies | H04B 17/102 |
| 10,979,152 | B1 * | 4/2021 | West | H04B 17/12 |
| 11,177,567 | B2 * | 11/2021 | Khalil | H01Q 3/267 |
| 11,811,461 | B2 * | 11/2023 | Chou | H01Q 3/38 |
| 12,052,063 | B2 * | 7/2024 | West | H04B 17/25 |
| 12,095,171 | B2 * | 9/2024 | Khalil | H01Q 21/22 |
| 12,149,294 | B2 * | 11/2024 | Srinivas | H04B 7/18513 |
| 12,149,336 | B2 * | 11/2024 | Bellemare | H04J 13/0048 |
| 12,451,978 | B2 * | 10/2025 | Raghavan | H04B 17/13 |
| 2015/0349419 | A1 * | 12/2015 | Frink | H01Q 3/267 342/371 |
| 2016/0043465 | A1 * | 2/2016 | McDevitt | G01S 13/91 342/368 |
| 2016/0211577 | A1 | 7/2016 | Miller et al. | |
| 2021/0376938 | A1 | 12/2021 | West et al. | |
| 2022/0247501 | A1 | 8/2022 | Srinivas et al. | |
| 2023/0006754 | A1 | 1/2023 | Bellemare et al. | |

FOREIGN PATENT DOCUMENTS

| | | | | |
|---|---|---|---|---|
| EP | 3876438 | A1 | 9/2021 | |
| EP | 3917040 | A1 | 12/2021 | |
| EP | 4503479 | A1 * | 2/2025 | H04B 17/26 |
| IN | 201914003188 | A | 3/2020 | |
| WO | WO-2019041868 | A1 * | 3/2019 | G01R 29/10 |

OTHER PUBLICATIONS

European Search Report received in EP Application No. 24183555.2, Dec. 9, 2024, 11 pages.

* cited by examiner

LOW SIDE LOBE LEVEL AESA HYBRID FATE / ENSEMBLE CALIBRATION

BACKGROUND

Active electronically scanned arrays (AESAs) used in various avionics systems require Low Side Lobe operation. Low side lobe operation across an AESA's scan volume requires very precise calibration to correct electrical phase and amplitude errors in the RF channels, aperture tolerances, part-to-part variation in RFIC performance, and variation over temperature and frequency. Calibration of AESAs has traditionally been limited to the generation of high accuracy phase and gain calibration coefficients required to achieve low side lobe far field radiation patterns. Coefficients generated by such calibration are in units of dB (for gain) and degrees (for phase). In practice, applying these calibration coefficients involves passing the gain and phase values into a gain table and a phase table. These tables may be generated during calibration or may be provided in the RFIC datasheet, but typically the RFIC data sheet input alone is insufficient as the circuit and radiating aperture contribute to the above-mentioned phase and amplitude errors and must also be compensated for in the calibration process.

Reliance on a single gain and phase table for a full array will result in residual gain and phase errors after calibration due to part-to-part variation and tolerance within the AESA's passive radio frequency (RF) circuitry. Low side lobe AESA precision is extremely sensitive to phase and amplitude errors in the AESA's passive RF combiner circuits, the active RFIC beam former, and T/R module RFICs and the passive radiation aperture. Effective calibration needs to be within tenths of dBs in amplitude and no more than a few degrees of phase.

Amplitude and phase errors typically worsen with the lower gain settings that are required for low side lobe operation. Less than 25 dBp AESA side lobe levels typically require greater than 10 dB amplitude variation from the aperture center to the aperture periphery. Mutual coupling/scan impedance changes as a function of scan, which provides suboptimum termination (i.e., impedance mismatch) to RFIC components. Impacts of gain and phase variation after calibration become pronounced when applying a low SLL taper.

Low Side Lobe level AESA calibration is traditionally a difficult process, requiring specialized near field or far field ranges to sample the fields radiated from (or received by) the AESA under test. These ranges can become prohibitively expensive, require extensive design and analysis, as well as sophisticated mechanical alignment systems to ensure test and measurement accuracy. The slow calibration and test validation execution times of these types of approaches are very unattractive for high throughput production.

Current state-of-the-industry AESA calibration techniques include near field range holographic back projection that requires repetitive full near field scans to drive errors in the aperture hologram to zero, which is time consuming; and planar, cylindrical, or spherical near field ranges, which are expensive and require a large footprint (facility floor space). Repetitive near field range holographic back projection convergence calibration is accurate but time consuming (e.g., approximately 1-hour elapsed calibration execution time for 3 back projections with commensurate T/R amplitude and phase adjustment iterations for a 1024 element AESA at single frequency and single beam pointing angle).

Far field anechoic chambers are slow, expensive, and have a large footprint. The are also AESA physical size and weight limitations. A far field compact range is also slow and expensive, with AESA physical size and weight limitations. Other calibration techniques have been limited to gentle side lobe tapers required for SATCOM.

It would be advantageous to have a system and method for AESA calibration for low side level AESA calibration.

SUMMARY

In one aspect, embodiments of the inventive concepts disclosed herein are directed to a calibration system for AESAs. An initial calibration is performed according to known methodologies. Near field measurements are then taken to obtain the AESA far field radiation pattern and complex aperture holograms. Based on the complex holograms, phase and amplitude error maps are computed. T/R module amplitude and phase are then adjusted to compensate for the error map.

In a further aspect, the system switches back to the far field radiation pattern and commensurate aperture hologram back projection to iteratively recompute far field corrections and new hologram error maps until a desired level of precision is reached.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
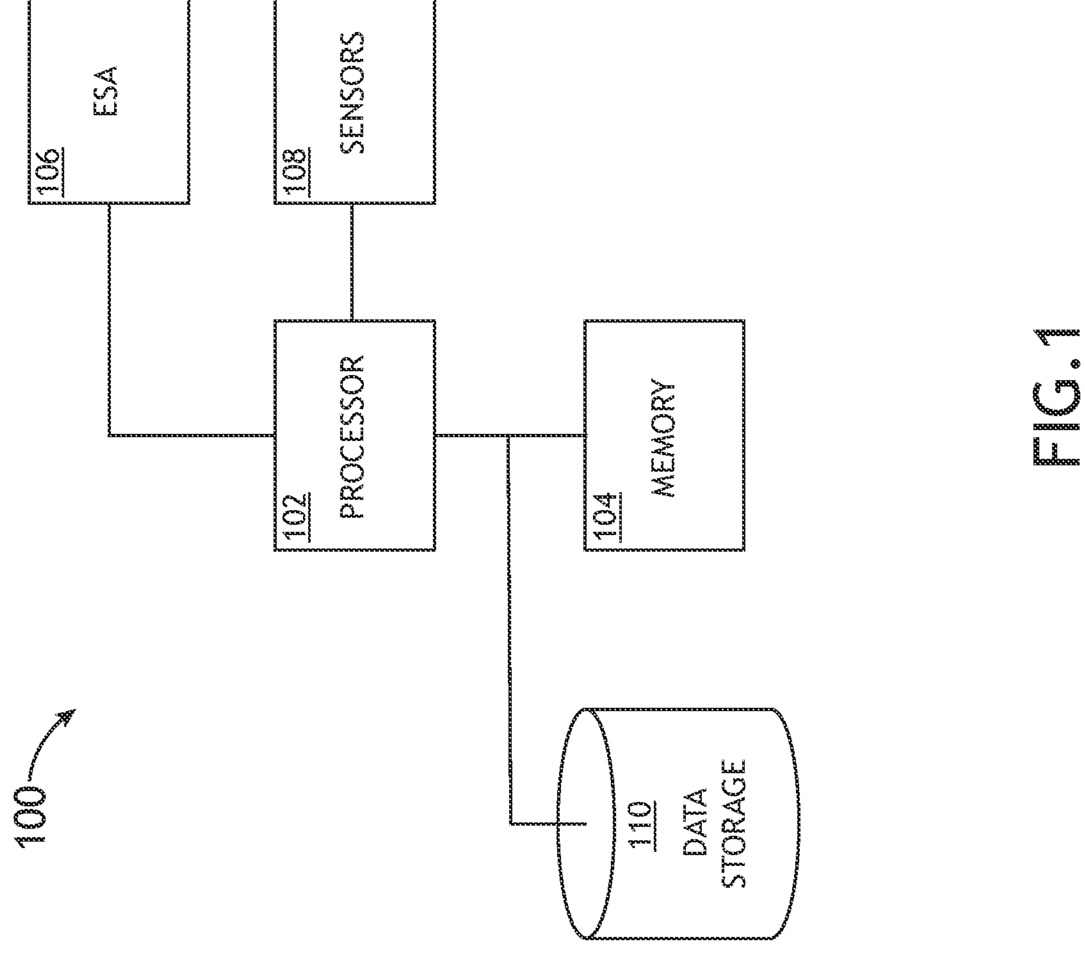
FIG. 1 shows a block diagram of a system useful for implementing exemplary embodiments of the present disclosure.

Before explaining various embodiments of the inventive concepts disclosed herein in detail, it is to be understood that the inventive concepts are not limited in their application to the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of a feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in at least one embodiment" in the specification does not necessarily refer to the same embodiment. Embodiments of the inventive concepts disclosed may include one or more of the features expressly described or inherently present herein, or any combination or sub-combination of two or more such features.

Broadly, embodiments of the inventive concepts disclosed herein are directed to a calibration system wherein an initial calibration is performed according to known methodologies. Near field measurements are then taken to obtain the AESA far field radiation pattern, and complex aperture holograms. Based on the complex holograms, phase and amplitude error maps are computed. T/R module amplitude and phase are then adjusted to compensate for the error map. The system switches back to the far field radiation pattern and commensurate aperture hologram back projection to iteratively recompute far field corrections and new hologram error maps until a desired level of precision is reached.

Referring to FIG. 1, a block diagram of a system 100 useful for implementing exemplary embodiments of the present disclosure is shown. The AESA-based RF system 100 includes a processor 102 and memory 104 storing processor executable code for configuring the processor 102 to apply signals to an AESA 106.

In at least one embodiment, a plurality of sensors 108 or sensor packages are disposed proximal to the ESA 106, in a near field range test environment configuration, to directly receive signals from different radiating elements of the ESA 106 at one time. Such embodiment, may or may not include a motor 108 or actuator to rotate the ESA 106. The sensors 108 are in data communication with the processor 102; in at least one embodiment, multiple sensors 108 are coherent with each other such that data points may be correlated in time and potentially in orientation to the ESA 106 where the ESA 106 not stationary (e.g., where the ESA 106 in conformal and is rotated to make distinct portions of the ESA 106 orthogonal to the sensors 108).

The processor 102 preloads initial, theoretically derived, perfect ESA targets (potentially stored in a data storage element 110) in the ESA T/R modules. The sensors 108 take planar near field measurements and the processor 102 calculates far field radiation patterns and various first order models according to near field range algorithms. The processor 102 produces element specific far field correction factors based on the far field radiation patterns and first order models, as compared to the known, perfect AESA targets.

In the near field range, when measuring a tapered array, the side lobe levels are often insufficient for certain applications after calibration. Using the near field range, it is possible to get a projection of a hologram onto the aperture and fine tune the results from the calibration. The near field range is the gold standard for ESA 106 performance. Therefore, the processor 102 also calculates complex aperture holograms are calculated.

Once the aperture phase and amplitude correction factors required for low-side far field radiation patterns are applied, the processor 102 compares hologram amplitudes and phase data to desired amplitude and phase targets from a data storage element 110. Based on that comparison, the processor 102 calculates phase and amplitude error maps across the face of the ESA 106. Holograms are back projections of the data collected by the sensors 108 (near field scanners). Such holograms are mapped onto a model of the ESA 106. Phase offsets and gain offsets for each radiating element are identified based on the hologram mapped model. The T/R modules' amplitude and phase are adjusted to compensate for the error maps.

In at least one embodiment, once the T/R module amplitude and phase adjustments are determined, the processor 102 performs another planar near field measurement to determine far field radiation patterns via the adjusted T/R modules. In at least one embodiment, the steps may be iteratively performed until the ESA 106 is calibrated within some desired level of precision. The desired level of precision may be defined by a threshold side lobe level.

Figure 2:
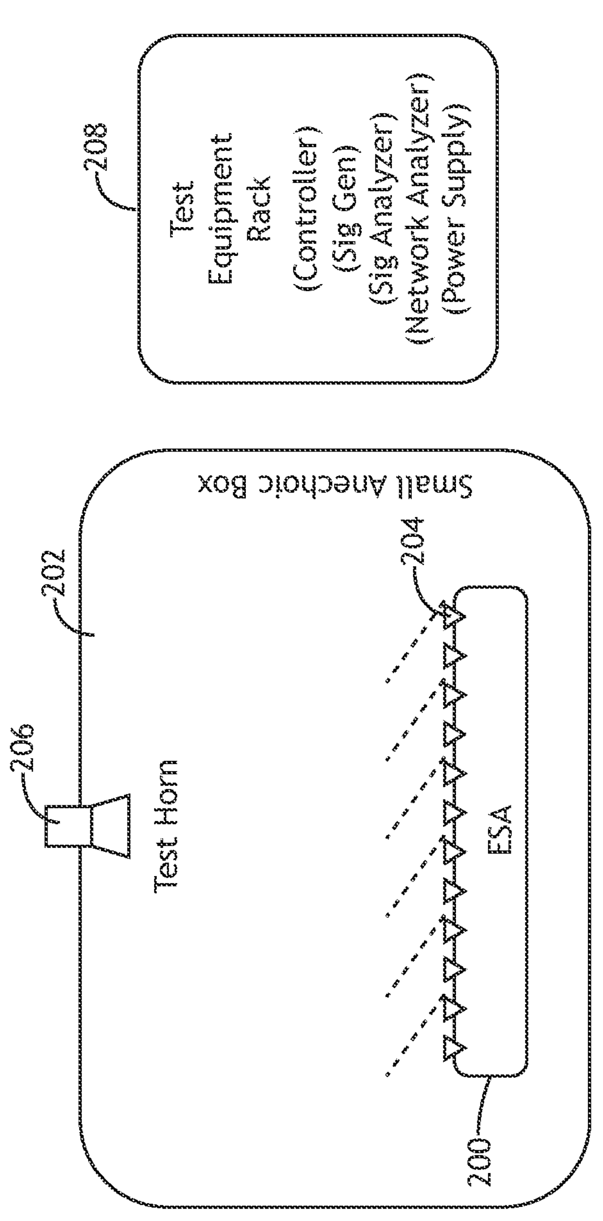
FIG. 2 shows a block diagram of a system for calibrating an ESA.

Referring to FIG. 2, a block diagram of a system for calibrating an ESA is shown. When calibrating an ESA 200 in an anechoic box 202, each radiating element 204 is driven a defined calibration sequence, a processor configures ESA beamformer chips to step through the entire calibration sequence. Signals are collected by a test probe 206 disposed in the anechoic box 202 and delivered to test equipment 208. The test equipment 208 may include a signal analyzer and network analyzer. A far field phase and amplitude correction to account for the non-idealness of probe 216 can be included in the overall calibration scheme. A processor produces ESA calibration coefficients specific to the ESA 200 based on signal data from the network analyzer. FIG. 2 illustrates the calibration set up for a planar AESA for simplicity. This block diagram can be further extended/generalized to accomplish robust calibration methodologies for singly and doubly curved conformal AESA architectures.

Phase coding utilizes waveform orthogonality between the radiating elements 204 and the test probe 206 based on the Hadamard linear algebra theory. The orthogonality properties of the Hadamard sequence essentially de-correlates the radiating elements 204 such that they operate as a collection of distinct, uncorrelated and independent RF channels. The application of Hadamard orthogonal coding and linear algebra may be better understood with reference to Seth D. Silverstein *Application of Orthogonal Codes to*

*the Calibration of Active Phased Array Antenna for Communication Satellites* (IEEE Transactions on Signal Processing, Vol. 45, No. 1, 1997), which is hereby incorporated by reference. Each radiating element 204, RF channel operates in a far field radiation mode, in an uncorrelated aggregate fashion, while being simultaneously transmitted or received. The test probe 206 receives or transmits the uncorrelated radiating element 204, RF channel signals. The phase and amplitude coding can also utilize non-Hadamard encoding techniques.

Since the modulation sequence is known a priori, the individual channels are parsed out of the aggregate received or transmitted signal. The mean path length, test probe 206, and test horn antenna radiation patterns are mathematically removed from the data set to reveal the amplitude and phase shift of each RF channel. In at least one embodiment, Hadamard matrices may be used to measure individual radiating element 204 gain and phase response.

The calibration process described herein defines a far field calibration portion and a near field calibration portion based on back projection holograms. Near field back projection to obtain the aperture hologram may include near field methodologies such as planar, cylindric, spherical, planar-polar, etc. Furthermore, far field techniques may be applicable for specialized applications such as very large ground based AESAs. In at least one embodiment, the entire process may be performed in a single near field range test environment. Alternatively, the ESA 200 may be transferred as necessary between test environments.

Figure 3:
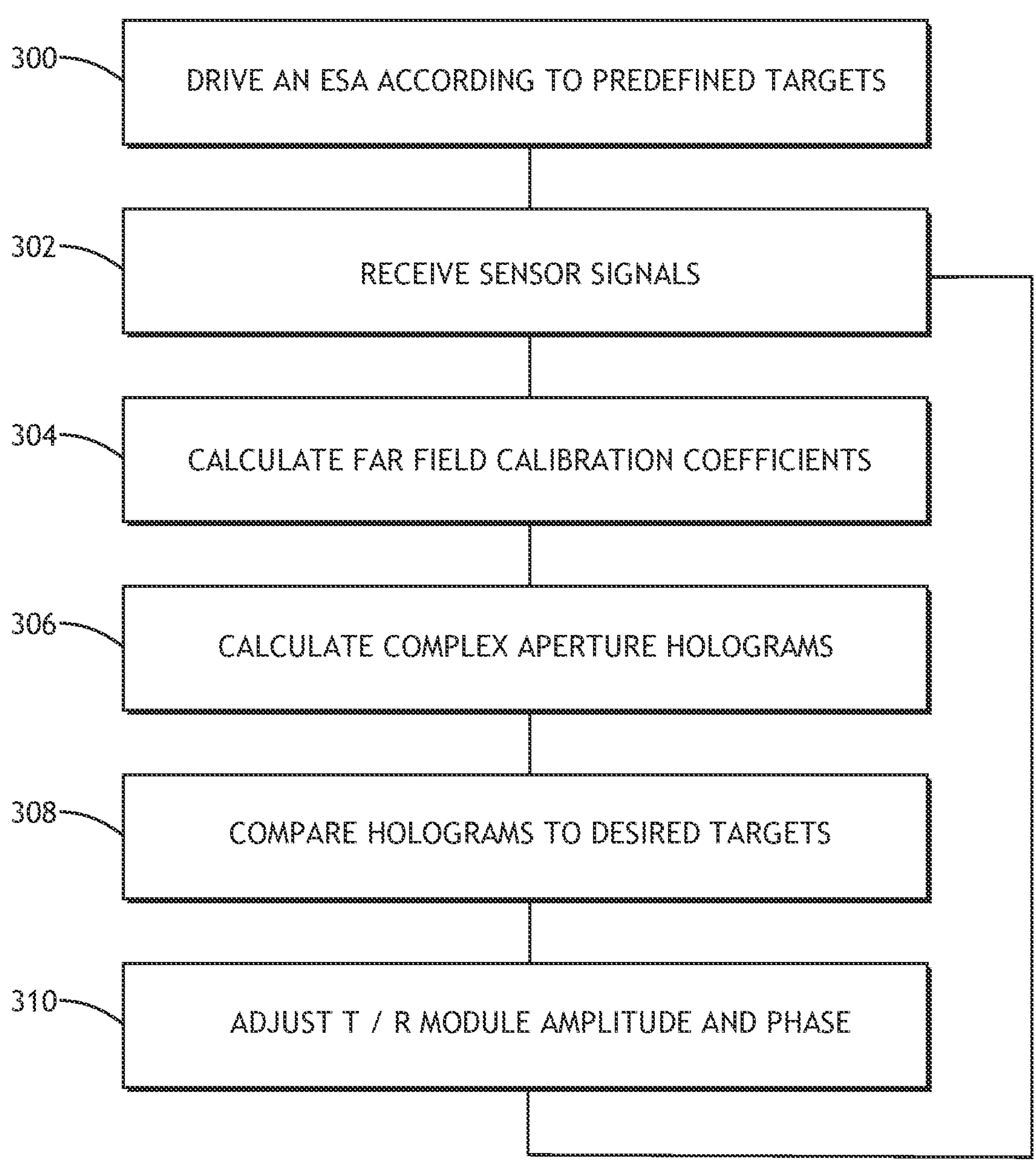
FIG. 3 shows a flowchart of an exemplary embodiment of a method for calibrating an ESA.

Referring to FIG. 3, a flowchart of an exemplary embodiment of a method for calibrating a conformal ESA is shown. A calibrating system drives 300 the radiating elements of an AESA according to predefined, ideal ESA amplitude and phase targets in a near field test range environment. Sensors receive 302 signals from the radiating elements. Complex AESA aperture amplitude and phase calibration coefficients required for low-side lobe far field radiation patterns are calculated 304 based on those signals. Such calculation 304 may be by a best-fit algorithm.

In at least one embodiment, calibration allows a conformal, non-planar ESA to operate in a narrow band. Alternatively, or in addition, arbitrary surface shapes may be calibrated via group delay for ultra-wideband systems; in such embodiment, time delay may be the factor being calibrated for the ultra-wideband array as opposed to phase delay.

In at least one embodiment, group delay performance is determined via partial derivatives taken at specific frequencies. Alternatively, or in addition, group delay performance is determined is taken directly from a network analyzer measurement of group delay.

In at least one embodiment, the calibration process may be generalized to multidimensional calibration algorithms as a function of, for example, beam scan/pointing, polarization state, dynamic beam shape control, temperature (in the case of in situ calibration where an anechoic box is adapted to a standard environmental test chamber), etc.

In at least one embodiment, the ESA undergoes far field calibration; then the ESA is transferred to a planar or near field range. Alternatively, far field calibration is performed in the near field range. While performing planar near field measurements to obtain the far field radiation patterns, complex aperture holograms are calculated 306. Near field range algorithms produce robust aperture holograms. The hologram output files are compared 308 to desired phase and amplitude targets. A phase and amplitude error map is computed across the entire array face. The T/R modules amplitude and phase are adjusted 310 to compensate for the error map. Near field range algorithms to obtain the aperture holograms are very robust, mature, and National Institute of Standards and Technology (NIST) traceable for maximum accuracy, resolution, and precision.

In at least one embodiment, new planar near field measurements are taken 302 based on the update T/R modules. The process may be repeated iteratively to arrive at a desired level of precision/performance.

Data link, directional comm, Radar and SATCOM AESAs, e.g., have different crucial parameters for calibration. Existing calibration techniques are well suited for calibrating the crucial parameters necessary for SATCOM because such systems do not require very low-side lobes levels to meet systems requirements unlike general radar application. However, one of the critical parameters for radar (e.g., X band multi-function radar AESAs) is low side lobe operation. Low side lobe operation is desirable when creating nulls in the radiation pattern. Embodiments of the present disclosure are suitable for low side lobe calibration. Furthermore, embodiments of the present disclosure allow for precise calibration in minutes as compared to hours using existing techniques. Embodiments of the present disclosure enable quick calibration and production testing of small arrays; the principles are also applicable to hybrid far field/near field calibration.

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The forms herein before described being merely explanatory embodiments thereof, it is the intention of the following claims to encompass and include such changes. Furthermore, any of the features disclosed in relation to any of the individual embodiments may be incorporated into any other embodiment.

What is claimed is:

1. A computer apparatus comprising:

one or more sensors disposed proximal to an ESA antenna in a near field range test environment to directly receive signals from radiating elements of the ESA antenna; and at least one processor in data communication with a memory storing processor executable code for configuring the at least one processor to:

drive radiating elements in an electronically scanned array (ESA) antenna being calibrated when the ESA is in a transmit mode;

receive signals from the one or more sensors based on the driven radiating elements when the ESA is in a receive mode;

calculate far field calibration coefficients for each of the radiating elements;

calculate one or more error maps corresponding to a face of the ESA antenna being calibrated;

determine amplitude and phase adjustments for one or more T/R modules in the ESA being calibrated;

apply the amplitude and phase adjustments to the one or more T/R modules in the ESA being calibrated; and recalculate far field calibration coefficients for each of the radiating elements to produce a calibrated ESA antenna to a desired far field radiation pattern.

2. The computer apparatus of claim 1, wherein the amplitude and phase adjustments recalculated far field calibration coefficients produce side lobe levels of less than −30 dBp in the receive mode.

3. The computer apparatus of claim 1, wherein the at least one processor is further configured to iteratively recalculate aperture amplitude and phase or delay calibration coefficients and redetermine amplitude and phase adjustments until a threshold precision is reached for desired far field performance.

4. The computer apparatus of claim 3, wherein the threshold precision is defined by a far field null depth, width, and azimuthal and elevation location.

5. The computer apparatus of claim 1, wherein the error maps are defined by complex aperture holograms.

6. The computer apparatus of claim 1, wherein the ESA antenna being calibrated is disposed in a near field range test environment.

7. A method comprising:

driving radiating elements in an electronically scanned array (ESA) antenna being calibrated;

receiving signals based on the driven radiating elements;

calculating far field calibration coefficients for each of the radiating elements;

calculating one or more error maps corresponding to a face of the ESA antenna being calibrated;

determining amplitude and phase adjustments for one or more T/R modules in the ESA being calibrated;

applying the amplitude and phase adjustments to the one or more T/R modules in the ESA being calibrated while in a transmit mode; and recalculating far field calibration coefficients for each of the radiating elements to produce a calibrated ESA antenna to a desired far field radiation pattern.

8. The method of claim 7, wherein the amplitude and phase adjustments recalculated far field calibration coefficients produce far field nulls.

9. The method of claim 8, wherein a threshold precision is defined by a far field null depth, width, and azimuthal and elevation location.

10. The method of claim 7, further comprising iteratively recalculating far field calibration coefficients and redetermining amplitude and phase adjustments until a threshold precision is reached.

11. The method of claim 7, wherein the error maps are defined by complex aperture holograms.

12. The method of claim 7, wherein the ESA antenna being calibrated is disposed in a near field range test environment.

13. An antenna calibration system comprising:

a near field range test environment;

one or more sensors disposed in the near field range test environment; and at least one processor in data communication with a memory storing processor executable code for configuring the at least one processor to:

drive radiating elements in an electronically scanned array (ESA) antenna being calibrated when in a transmit mode;

receive signals from the one or more sensors based on the driven radiating elements when the ESA is in a receive mode;

calculate complex aperture calibration coefficients for each of the radiating elements;

calculate one or more error maps corresponding to a face of the ESA antenna being calibrated;

determine amplitude and phase adjustments for one or more T/R modules in the ESA being calibrated;

apply the amplitude and phase adjustments to the one or more T/R modules in the ESA being calibrated; and recalculate far field calibration coefficients for each of the radiating elements to produce a calibrated ESA antenna to a desired far field radiation pattern.

14. The antenna calibration system of claim 13, wherein the amplitude and phase adjustments recalculated far field calibration coefficients produce far field nulls according to desired width, depth, and azimuthal and elevation location.

15. The antenna calibration system of claim 13, wherein the at least one processor is further configured to iteratively recalculate far field calibration coefficients and redetermine amplitude and phase adjustments until a threshold precision is reached.

16. The antenna calibration system of claim 15, wherein the threshold precision is defined by a desired side lobe level.

17. The antenna calibration system of claim 13, wherein the error maps are defined by complex aperture holograms.

* * * * *